United States Patent [19]

Luo et al.

[11] 4,006,383
[45] Feb. 1, 1977

[54] ELECTROLUMINESCENT DISPLAY PANEL WITH ENLARGED ACTIVE DISPLAY AREAS

[75] Inventors: Fang-Chen Luo, Turtle Creek; Thomas P. Brody; David H. Davies, both of Pittsburgh, all of Pa.

[73] Assignee: Westinghouse Electric Corporation, Pittsburgh, Pa.

[22] Filed: Nov. 28, 1975

[21] Appl. No.: 636,281

[52] U.S. Cl. .................. 315/169 TV; 313/505; 313/509; 315/51; 340/166 EL
[51] Int. Cl.² .................................. H05B 33/02
[58] Field of Search .......... 315/51, 169 TV, 169 R; 340/166 EL; 313/498, 502, 505, 506, 509

[56] References Cited
UNITED STATES PATENTS

| | | | |
|---|---|---|---|
| 3,379,931 | 4/1968 | Soldano | 315/169 R |
| 3,512,041 | 5/1970 | Dalmasso | 313/505 X |
| 3,786,307 | 1/1974 | Robinson | 315/169 TV |
| 3,885,196 | 5/1975 | Fischer | 315/169 TV |

Primary Examiner—Eugene La Roche
Attorney, Agent, or Firm—W. G. Sutcliff

[57] ABSTRACT

An improved electroluminescent display panel having an X-Y array of display elements upon a planar insulating substrate. Integral thin film transistor circuit elements and drive signal buses are interconnected on the panel with individual electroluminescent electrodes covering a large area of the panel to increase the active display area. The electroluminescent electrode is a multilevel electrode with a first level portion disposed on the insulated substrate, a second level electrode portion disposed over an insulative polymerized layer which covers the thin film circuit areas and the drive signal buses, and a connecting electrode portion which extends between the first and second level electrode portions.

4 Claims, 6 Drawing Figures

ELECTROLUMINESCENT DISPLAY PANEL WITH ENLARGED ACTIVE DISPLAY AREAS

BACKGROUND OF THE INVENTION

The present invention relates to flat panel display devices and more particularly flat panel electroluminescent display devices. In such devices an X-Y array of display elements or cells, are provided upon an insulated substrate, and are interconnected together to produce a large area flat panel display which is substitutable for a cathode ray tube. Each of the display elements of the array comprises integral thin film transistor switching and control circuit elements, which are used to selectively address specific areas of the planar electroluminescent phosphor layer which is excited to produce light output in a display pattern.

Such an electroluminescent display panel is described in copending application identified as Westinghouse Docket Entry 45875 entitled, "Flat Panel Display Device With Integral Thin Film Transistor Control System." As described in the copending application, the electroluminescent display panel is fabricated by vacuum depositing sequential layers of selected materials to form the X-Y array of display elements on an insulative substrate. Each display element covers an equal area of the panel, and a substantial portion of the area of the display element is occupied by the individual thin film circuit elements and particularly by the requisite spacing between such elements to prevent unwanted electrical interaction between the elements. For high resolution applications the physical size and area of this display element must be reduced, and this further increases the percent area of each display element taken up by the thin film circuit elements as opposed to the electroluminescent electrode. This electrode is the only portion of the display element which actually excites the electroluminescent phosphor which is disposed uniformly over the panel. The actual size of the thin film circuit elements cannot readily be reduced because of the need to maintain desired electrical characteristics. This is particularly true with respect to the storage capacitive element which is required in one embodiment of the addressing circuit utilized for such an electroluminescent display panel. In order to achieve a large enough capacitive value for this storage capacitor, its effective area is relatively large.

In the above described copending application, a technique for effectively isolating the electroluminescent phosphor layer from the thin film circuit elements and the drive signal buses is set forth. A laminated photo-polymerizable layer is provided over such thin film circuit elements and the signal buses to thus effectively isolate the electroluminescent phosphor from these electrical components. This laminated photo-polymerizable layer is applied in a relatively thick layer with the photo-polymerizable insulative layer being selectively removed from the areas over the electroluminescent electrode to permit contact of such electrode with the phosphor layer which is then deposited over such electrodes and over the insulative polymerized portions which cover the thin film circuitry and signal bus elements.

The brightness and resolution of such electroluminescent display panels has been limited by the effective area of the electroluminescent phosphor layer which is in contact with and excited by individual electroluminescent electrodes. Till now this lit area has been about fifteen percent of the panel area. It is, therefore, highly desirable that the electroluminescent electrodes be extended to cover a greater area of the total panel area.

SUMMARY OF THE INVENTION

An electroluminescent display panel structure is set forth in which the individual electroluminescent electrodes are extended over a substantial area of the total display panel. The individual electroluminescent electrode extends from the insulative substrate and covers a substantial portion of the insulative polymerized layer above the thin film circuit portions of the display element. The individual electroluminescent electrodes are comprised of a multi-level electrode with a first level electrode portion disposed on the insulative substrate, and with a second level electrode portion disposed on the insulative polymerized layer, with a connecting electrode portion extending between the first and second level electrode portions.

A preferred method of insuring deposition of a continuous connecting electrode portion is set forth.

The effective lit area and brightness of the panel can thus be greatly increased, with a recent panel lit area being greater than about seventy percent of the panel area.

DESCRIPTION OF THE PREFERRED EMBODIMENTS

Figure 1:
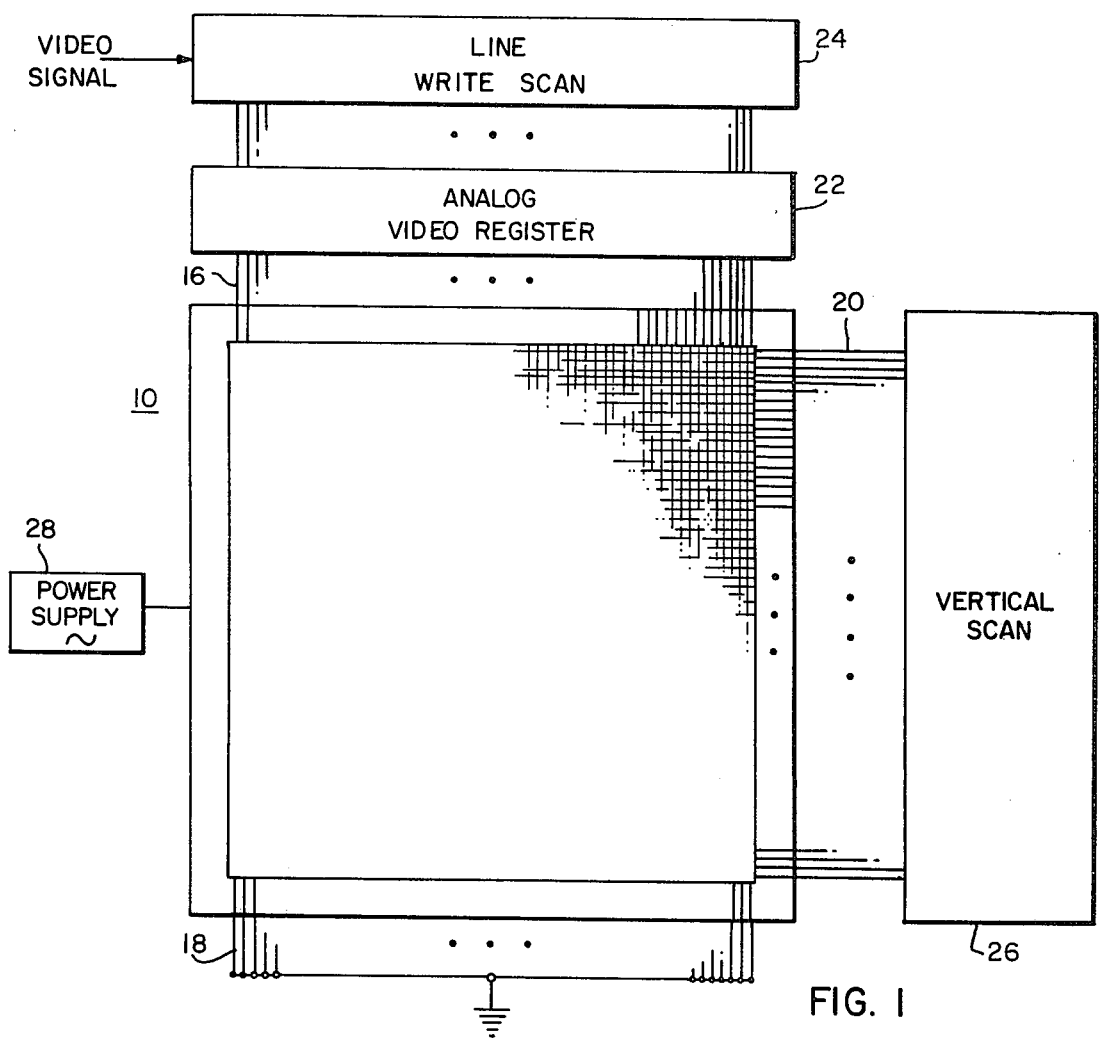
FIG. 1 is a schematic representation of electroluminescent display panel of the present invention connected to the drive means.
Figure 3:
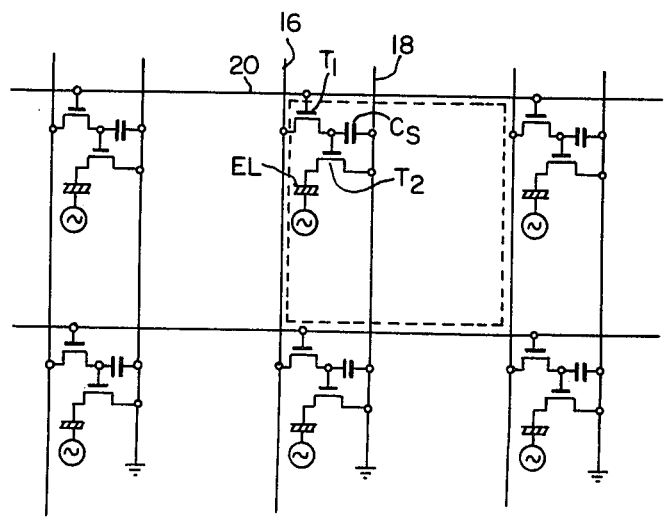
FIG. 3 is an enlarged schematic representation of the display element array pattern illustrating the thin film circuitry of the display panel.
Figure 2:
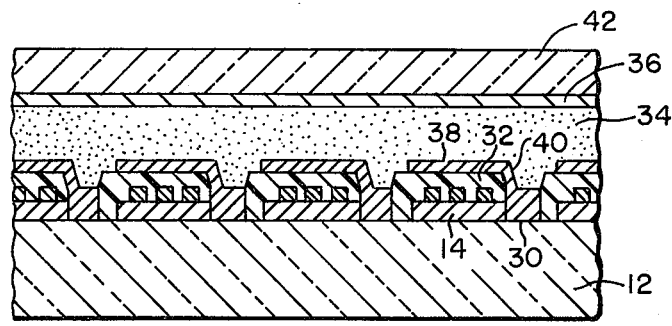
FIG. 2 is a cross-sectional view through a portion of the panel which illustrates the multi-level electrode structure of the panel of the present invention.

The electroluminescent display panel 10 is seen schematically in FIG. 1 connected to operative drive circuitry. The display panel 10 comprises a planar insulating substrate 12 upon which are disposed thin film circuit elements 14 which are arrayed as X-Y rows and columns of individually addressable and controllable display elements which are interconnected by addressing and drive signal buses 16, 18 and 20. The basic thin film transistor circuit and method of fabrication is set forth in copending application discussed above which is herein incorporated by reference. Each display element as seen more clearly in FIG. 2 includes a switching transistor $T_1$, a drive transistor or power transistor $T_2$, and a storage capacitor $C_s$. The video signal impressed on the $X_i$ bus from analog video register 22 and line write scan means 24 to which the video signal is fed through switching transistor $T_1$ when the appropriate addressing signal is present on switching bus $Y_j$ turning on transistors $T_1$ to charge the storage capacitor $C_s$ to a voltage level which is indicative of the video signal. The switching buses $Y_j$ are individually connected to vertical scan driver 26. A high frequency power supply 28 is connected to a common light transmissive, top electrode above the electroluminescent phosphor to actuate the phosphor. When all of the capacitors $C_s$ in a given line are charged with the video signal a gate signal is applied to the gate of transistor $T_2$ turning $T_2$ on, and permitting application of the high frequency display power signal across the electroluminescent electrodes and the EL phosphor layer.

The thin film transistor circuit elements $T_1$, $T_2$, $C_s$, and the information signal, switching signal and power signal buses are deposited in successive stages as thin films of the respective materials with appropriate insulation layers provided thereover upon the substrate 12. A first level electroluminescent electrode portion 30 is deposited directly upon the insulating substrate 12 during one of the metal vapor deposition stages. The partially fabricated panel is thereafter removed from the vacuum system and a laminted photo-polymerizable layer is pressed over the entire panel area. The laminated photo-polymerizable layer is an insulating material which can be polymerized in place upon exposure to the photo-radiation. A suitable laminated photoresist is "RISTON," a DuPont trademarked material. This polymerized insulator layer 32 is a relatively thick layer typically being about 1 mil in thickness to effectively insulate the thin film circuit elements and the various buses from the electroluminescent phosphor layer 34 which covers the entire panel. It has been the practice to merely contact the first level electroluminescent electrode 30 with the phosphor material. Thus, only that portion of the electroluminescent phosphor layer directly above the electrode deposited on the substrate was actually excited to luminescence. A common top electroluminescent electrode 36, which is light transmissive, is disposed atop the top of the phosphor layer 34. This common electrode 36 is connected to the power supply 28. A glass face plate 42 may be provided over top electrode 36. The insulating polymer layer 32 covers all of the thin film circuit components except the first level electroluminescent electrodes 30. Apertures are provided in this polymer insulating layer 32 by a further resist technique to expose the first level electrodes. In these cross-sectional views, the relative dimensions of the layers is greatly exaggerated for ease of description.

In order to further expand the active area of the electroluminescent phosphor a second level electroluminescent electrode 38 is deposited atop the polymer insulator layer 42. This second level electroluminescent electrode 38 is generally planar and parallel to the first level electroluminescent electrode. A connecting electrode portion 40 electrically connecting the first level electroluminescent electrode and the second level electroluminescent electrode is deposited along the slope of the polymer insulator layer 32 at the edges of the aperture which is opened in the polymer insulator layer about the electrode 30. The first level electrode portion 30 is a generally rectangular pad which occupies a portion of the area of each unit display element. The apertures which are formed in the polymer insulator layer 32 are rectangular and have a generally inverted cone cross section, i.e., the aperture area is smaller at surface of the first level electrode 30 than it is at the top surface of the layer 32. A gradual inward sloped edge is thus formed in layer 32 at each said aperture above each electrode 30. The electroluminescent phosphor layer 34 is thereby deposited over the entire display panel in contact with the first level electroluminescent electrode 30, the second level electroluminescent electrode 38 and the connecting electrode portion 40, so that a greatly increased area of phosphor for a given display element is activated. This greatly improves the brightness level of the panel. The individual electroluminescent electrodes can thus cover a substantial portion of the total area of the display panel, with the only area of non-coverage being the requisite spacing between adjacent edges of the individual electrodes. In achieving about seventy percent lit area the spacing between electrodes was about 8 mils, this spacing can be reduced to about 2–3 mils to further increase the electrode area and the lit area of the panel.

Figure 5B:
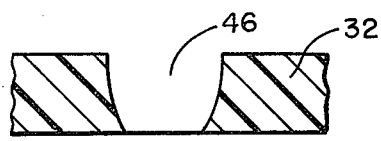
FIG. 5b is an illustration of the edge pattern of the photo-polymerized layer when fabricating using the method of the present invention as illustrated in FIG. 4.
Figure 5A:
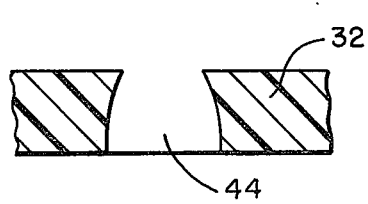
FIG. 5a is an illustration of the edge structure of the photo-polymerized layer when fabricating using prior art technique.

The fabrication of the multi-level electroluminescent electrode structure in the display panel of the present invention involves careful attention in deposition of the connecting electrode portion 40 to ensure a continuous, large area electroluminescent electrode made up of the first level and second level and connecting electrode portions. The thickness of the laminated photo-polymerizable insulating layer 32 presents a problem in that when the photo-polymerizable material is exposed to photo-radiation with a mask imposed over the first electroluminescent electrode area when the apertures are formed over the electrodes 30 an edge effect is produced at the edge of the mask due to diffraction or scattering of the photo-radiation to produce what after developing of the unexposed area and forming of the aperture 44 is an overhang of polymerized material at the upper surface of layer 32 as seen in FIG. 5a. The formed aperture 44 has a smaller area at the upper surface of layer 32 than at the bottom surface. This overhang of photo-polymerized insulating material is undesirable in that it impedes deposition of an effective connecting electrode portion 40. This is because the metal layer which is vacuum deposited as the connecting electrode portion 40 is done by a line of sight vacuum deposition, and the overhang of photo-polymerized material prevents deposition of the metal in this overhang area. The edge of the photo-polymerized insulator adjacent the first level electroluminescent electrode desirably has a gradual slope as seen in FIG. 5b where the aperture 46 has the desired sloped edges with the aperture area at the upper surface of layer 32 exceeding the aperture area at the bottom surface to thereby permit line of sight metal deposition on these edges. The second level electroluminescent electrode 38 is vapor deposited at the same time as connecting electrode portion 40 atop the top planar surface of the photopolymer insulator layer 32. The individual electroluminescent electrodes are preferably formed of aluminum which is vacuum deposited to a thickness of about 1500 Angstroms in forming such electrodes. The first level portion 30 may be thicker than the second level portion 38 and the connecting portion 40 because during deposition of the second level and connecting portions the deposited metal also covers the already deposited first level electrode. This ensures good contact between each electrode portion.

Figure 4:
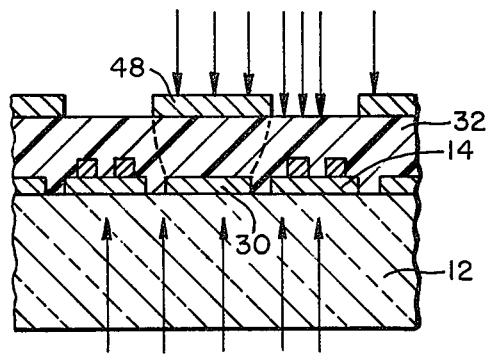
FIG. 4 is a schematic illustration of a fabrication technique utilized in fabricating the panel of the present invention.

A novel technique for ensuring that the slope of the edge of the insulator layer is as seen in FIG. 5b is illustrated by a novel method which can be best understood by reference to FIG. 4. The photo-radiation typically ultra-violet used for selectively polymerizing layer 32 is first directed through the substrate 12 passed the opaque first level electrode 30 itself as well as past the opaque thin film circuit portions. The photo-radiation directed through the substrate passes around the rectangular first level electrode 30 and photo-polymerizes the layer 32 with an edge profile about the electrode which approximates that seen in FIG. 5b. The bottom portion of layer 32 is fully polymerized while the upper portions of layer 32 above the edge of electrode 30 are unpolymerized so that when the layer 32 is developed to remove the unexposed areas the aperture 46 formed has a smaller area at the bottom than at the top surface with a gradual sloped edge provided. The sloped edge is thus available for direct line of sight metal deposition to lay down a continuous connecting electrode portion on this sloped edge.

After the exposure through the substrate 12 to establish the desired aperture shape, and before developing the layer to form the aperture, a second photo-exposure is carried out from the conventional direction, i.e., from the top surface of the layer 32. An opaque photomask is aligned over the first level electrode areas. The size or area of the opaque mask aligned above the first level electroluminescent electrode is greater than the first level electrode area. This is to prevent further exposure of the upper portion of layer 32 at the edges about the electrode 30 while at the same time exposing the layer 32 above the rest of the panel which were blocked by the opaque buses and the thin film circuitry when the photo-radiation was directed through the substrate. The layer 32 is then effectively polymerized at all areas except the area over the electrode 30.

The plural electrode level panel structure of the present invention provides a significant increase in the lit area of the phosphor layer and this increase in area produces an increased brightness panel. The brightness of the panel is further improved due to the fact that the second level portion of the electrode being atop the relatively thick insulating layer over the thin film circuitry. The phosphor layer between the second level electrode portion and the top electrode is less than between the first level electrode portion and the applied voltage across the thinner phosphor layer produces greater luminescent output from the phosphor.

We claim:

1. An electroluminescent display panel comprising an X-Y array of display elements each of which comprises integral thin film transistor switching and control circuit elements disposed on an insulative panel substrate and interconnected by drive signal buses, and each display element including an individual electroluminescent electrode disposed on the substrate, with an electrically insulative polymerized layer over the thin film elements and the signal buses, with the electroluminescent phosphor disposed over the entire panel area in contact with the individual electroluminescent electrodes and over the insulative polymerized layer, the improvement wherein the individual electroluminescent electrodes extend from the insulative substrate and cover a substantial portion of the insulative polymerized layer.

2. The electroluminescent display panel specified in claim 1, wherein the individual electroluminescent electrode is a multi-level electrode with a first level electrode portion disposed on the insulative substrate, a second level electrode portion disposed on the insulative polymerized layer, and a connecting electrode portion extending between the first and second level electrode portions.

3. The electroluminescent display panel specified in claim 1, wherein the individual electroluminescent electrodes are closely spaced from each other and cover a substantial portion of the total display panel.

4. The electroluminescent display panel specified in claim 1, wherein the individual electroluminescent electrodes are aluminum deposited to a thickness of a few hundred Angstroms.

* * * * *